Figure 1:
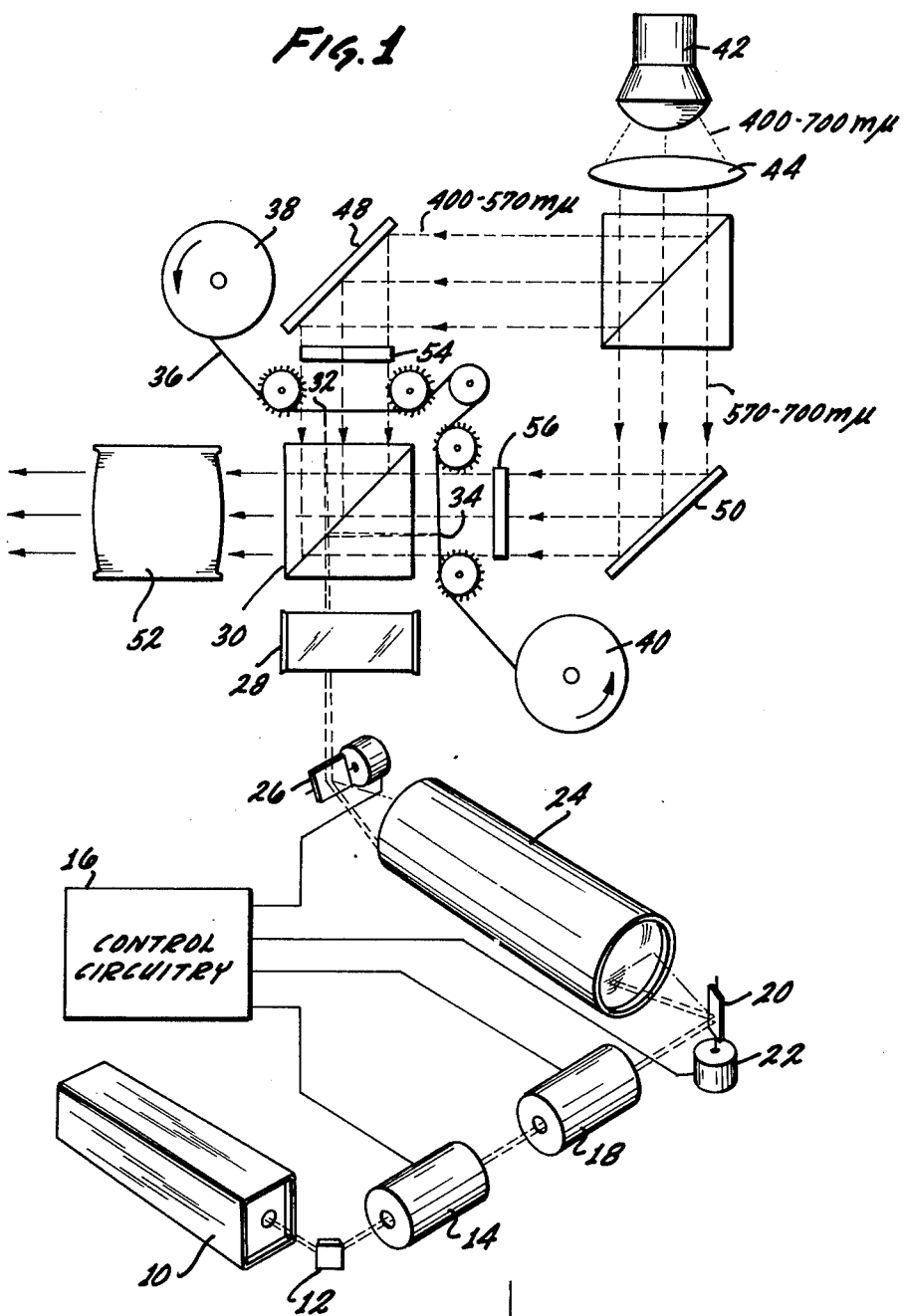

United States Patent [19]
Whitby et al.

[11] 3,961,334
[45] June 1, 1976

[54] COMBINED LASER RECORDING AND COLOR PROJECTION SYSTEM

[75] Inventors: Clyde M. Whitby, Valencia; Douglas L. White, Granada Hills, both of Calif.

[73] Assignee: The Singer Company, New York, N.Y.

[22] Filed: Aug. 11, 1975

[21] Appl. No.: 603,414

[52] U.S. Cl. .............................. 346/17; 346/76 L; 350/152; 350/173; 353/20; 353/82; 353/121
[51] Int. Cl.² .......................................... G01D 9/32
[58] Field of Search ............... 346/17, 76 L, 108, 1; 350/152, 154, 147, 173, 171, 169; 353/20, 82, 121

[56] References Cited
UNITED STATES PATENTS

| | | | |
|---|---|---|---|
| 2,161,126 | 6/1939 | Bigley | 350/173 X |
| 3,181,170 | 4/1965 | Akin | 346/108 |
| 3,704,934 | 12/1972 | Holmes | 350/152 |

Primary Examiner—Joseph W. Hartary
Attorney, Agent, or Firm—Edward L. Bell; Linval B. Castle; Joseph R. Dwyer

[57] ABSTRACT

A high-speed, permanent recording, multicolor projection display system in which the beam of a pulsed Argon laser is selectively deflected and focused to burn the desired images in a metalized film record medium which is back-illuminated for projecting the recorded images as they are produced. A channel selector polarizes the laser beam in either of two planes; each polarized channel is then selectively deflected and is focused through a dichroic/polarizer cube that transmits one channel and reflects the other channel to the metalized films in the focal planes where images are formed by the thermal action. Simultaneously with the recording action, the images are projected by the use of white light that is split into two colored light beams by a second dichroic cube and is reflected to backlight the images in each of the metalized films. The projected beams then pass back through the first dichroic cube where they either pass directly, as colored images, to the projection lens system, or are combined into white images before entering the projection lens system. Colored filters may be inserted into either or both of the projection lamp beams to produce various colored images.

5 Claims, 2 Drawing Figures

COMBINED LASER RECORDING AND COLOR PROJECTION SYSTEM

This invention relates to display systems and more particularly, to a combined laser recorder and projection system in which two channels of data are recorded by laser action on metalized films and are simultaneously projected, by backlighting the films, upon a display screen.

The laser recording and display system of the invention is most useful as an on-line system for the display of alphanumeric data, charts, map plotting, military training problems, etc. The beam of the pulsed laser is selectively deflected by galvanometers that are controlled by circuitry that receives signals from an external source, and controls the galvanometers to deflect the laser beam which is focused to burn images upon a metalized film. The film is backlighted so that projection energy is immediately allowed through the burned and cleared area of the film to be imaged on a projection display screen.

A feature of the invention is that two separate channels of data may be simultaneously recorded upon two separate film frames, both of which are backlighted and may be combined in perfect registration for projection. As will be subsequently explained, each channel may be projected at a different color and the use of the selected colored filters in the projection beam of each channel permits the projection of other desired colors. In addition, if identical data is simultaneously recorded on both channels and projected without the use of colored filters, the colored projected light from each channel will combine to produce white images on the projection screen.

The recording and projection system makes use of a pair of identical dichroic beam splitter cubes which develop a different dichroic for light polarized in the "P" plane than for light polarized in the "S" plane, as will be subsequently described. Dichroic polarizer cubes of this type are commercially available from the Herron Division of the Bausch and Lomb Optical Company.

Figure 2:
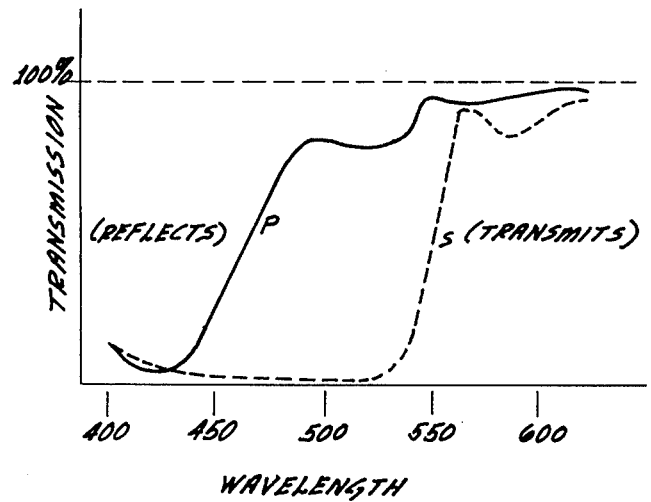

In the figures which illustrate a preferred embodiment of the invention:

FIG. 1 is a simplified drawing schematically illustrating the optical components and principle of the invention; and FIG. 2 is a drawing illustrating typical light transmission characteristics of the dichroic polarizer cubes that are used in the invention.

Turning now to a detailed description of the multicolor laser recording and display system, FIG. 1 schematically illustrates the principle components of a preferred embodiment of the invention and includes Argon laser 10 having primary emitting wavelengths of 488.0 and 514.5 m$\mu$. Laser 10 is preferably a pulsed Argon laser so that the individual pulses may be used to display alphanumeric characters in a dot matrix configuration. The output beam of laser 10 is reflected by a mirror 12 and enters a blanking modulator 14 which, upon command of control circuitry 16, deflects, blanks, or otherwise prevents the laser beam or selected pulses in the laser beam for entering the channel selector 18 which is also under the control of the circuitry 16 and which can rotate the polarization of the laser beam to 0° or 90° with respect to the polarization characteristics of the subsequent optical elements. Thus, control circuitry 16 may selectively energize the channel selector 18 to produce a laser beam which is polarized in either of two directions.

The polarized laser beam then falls upon the mirror 20 of the X-deflector galvanometer 22 which is under the control of circuitry 16 and selectively deflects the beam along the horizontal direction as it enters the relay optics 24. Relay optics are well-known in the art and in the embodiment being described, relay optics 24 focus the X-deflected laser beam from mirror 20 upon the mirror of the Y-deflection galvanometer 26. The laser beam is then focused by a focusing lens 28 through the dichroic polarizer cube 30.

Before proceeding further with the description of the laser recording and projection system of the invention, the characteristics of the dichroic polarizer 30 will be discussed. In a conventional dichroic cube, a dichroic material is selected that will transmit light energy above a desired wavelength and reflect the energy below the wavelength. In the present invention, the dichroic cube 30 contains a dichroic that transmits light energy above the wavelength of approximately 570 m$\mu$, but which has significantly different characteristics when the light energy is polarized in the "P" plane rather than in the "S" plane, as illustrated in FIG. 2. Thus, as illustrated in FIG. 2, light polarized in the "S" plane is nearly totally reflected at wavelengths shorter than approximately 520 m$\mu$ and nearly totally transmitted at wavelengths longer than approximately 560 m$\mu$. However, if the light energy is polarized in the "P" plane, the cube will transmit that energy in the range from approximately 460 m$\mu$ to beyond 700 m$\mu$. As previously mentioned, dichroic polarizer cubes such as the cube used in this invention and having characteristics as shown in FIG. 2 are commercially available and are manufactured by the Herron Division of the Bausch and Lomb Optical Company.

In the embodiment being described herein, the two primary lines of the pulsed Argon laser are 488.0 and 514.5 m$\mu$. It will be noted that both of these wavelengths fall between the "P" and the "S" polarization response curves shown in FIG. 2. Therefore, if the channel selector 18 has rotated the laser beam into the "P" polarization plane, the beam will be transmitted through the cube 30. If, on the other hand, channel selector 18 has rotated the laser beam into the "S" polarization plane, the beam will be reflected by the polarization sensitive dichroic in the cube 30.

The beam from laser 10, having been suitably deflected by the X-deflection galvanometer 22 and the Y-deflection galvanometer 26, is focused by focusing lens 28 to the focal points 32 and 34 depending upon the polarization impressed upon the laser beam by the channel selector 18. Positioned at focal points 32 and 34 are normally opaque recording mediums which are rendered transparent by the action of the focused laser beam. In the embodiment being described, the recording medium is a 35 millimeter metalized film 36 suitably mounted in sprockets, so that, when desired, previously used film may be withdrawn from a supply spool 38 and stored on a take-up spool 40. During normal operation of the laser recording and display system, it is contemplated that the metalized film 36 would not be moved by its sprocket wheels until completion of the particular problems or data display. While film 36 remains stationary, the focused laser beam may be suitably deflected to burn additional symbols or plotting data in the metalized film surface, all of which are simultaneously displayed along with existing data previously recorded in the same film frame.

While the focused laser beam is recording data, on the metalized surface of film 36, the film is being backlighted so that the film images are projected to a suitable display screen. The projection system includes a Xenon lamp 42 that emits white light in the normal visible range of 400–700 m$\mu$. Xenon lamp 42 is at the focal point of a condensing lens 44 which directs the white light to a dichroic element or cube 46. Cube 46 has the identical dichroic properties of the dichroic polarizer cube 30. That is, cube 46 need not have the polarization features as described in connection with FIG. 2, but should have identical dichroic properties as those of cube 30 so that the white light which is to be divided into two bands by cube 46 may ultimately be combined in cube 30 into white light as will be subsequently described.

The dichroic in cube 46, and also in that of cube 30, crosses over between transmission and reflection at approximately 570 m$\mu$ so that the green-blue-violet end of the spectrum between 400 and 570 m$\mu$ is reflected by the cube 46 while the red-orange-yellow bands in the range of 570–700 m$\mu$ are transmitted through the cube. As illustrated in FIG. 1, the reflected colored band is directed by a mirror 48 to backlight the metalized film 36 that is positioned at the focal point 32 of the laser recording beam and the transmitted band of light from cube 46 is directed by mirror 50 to backlight the metalized film 36 that overlies the focal point 34 of the focused laser beam.

Because the dichroic properties of cube 46 are identical with those of cube 30, the light band that was reflected by cube 46 will also be reflected by cube 30, and the light band transmitted by cube 46 will also be transmitted by cube 30. Therefore, the reflected light band from cube 46 will be projected through the metalized film 36 at the focal point 32 and this band will again be reflected by the dichroic in cube 30 to pass through the projection lens 52 to a suitable display screen. In the like manner, the band transmitted by cube 46 will pass through the transparent portion of film 36 at focal point 34 and, since this band was transmitted by cube 46, it will also be transmitted by cube 30. If film 36 is recorded at focal points 32 and 34 without an intervening movement of the deflection galvanometers, it will be apparent that the image formed by the reflected band will combine with that formed by the transmitted band to produce a white projected image. If the dichroic properties of cubes 30 and 46 differed, the images from the reflected and transmitted band would contain different quantities of various wavelengths and could not recombine to form white light.

In operation, it is obviously possible to obtain a projected white image by merely recording identical data on both channels of the metalized film 36 so that both the reflected and transmitted bands of light from the dichroic cube 46 will project identical images to the dichroic cube 30 which will combine these images in perfect registration into a white image. When it is desired to display an image in a red-orange-yellow color band, it is merely necessary to record the desired data only on that frame of the metalized film 36 that is backlighted by the transmitted light band from dichroic cube 46. Similarly, data burned only on the metalized film that is backlighted by the reflected band from dichroic cube 46 will produce a green-blue-violet projected image on the display screen. Different color combinations may be obtained by inserting filters 54 and 56 to absorb selected portions from the reflected and transmitted light bands. It is apparent, however, that the color produced by recombining the light projected through colored filters and the metalized film frame of both channels, cannot produce the white image but will produce a third color dictated by the selection of the filters 54 and 56.

Having explained our invention, what we claim is:

1. A recording and projection system including: a laser; means for selectively deflecting the beam of said laser and focusing said beam upon a recording medium having a normal first transparency state that is changed into a second transparency state where exposed to said focused laser beam; and means including backlighting means and a projection lens system for projecting the images in said recording medium to a display screen; the improvement comprising:

polarization means interposed in the path of said laser beam for selectively rotating said beam from a first plane of polarization to a second plane of polarization;

a dichroic polarizer cube interposed in said laser beam downstream from said polarization means, said cube reflecting said beam when polarized in said first plane and transmitting said beam when polarized in said second plane of polarization;

first and second recording mediums positioned at the focal points of said transmitted beam and said reflected beam;

a source of white projection light;

a dichroic element interposed in the beam produced by said source, said element having dichroic properties substantially identical with the dichroic properties of said dichroic polarizer cube, said element producing from said white light a band of long wavelength visible light that is transmitted through said element to backlight said first recording medium, and a band of short wavelength visible light that is reflected by said element to backlight said second recording medium;

whereby images recorded in said first recording medium are transmitted through said dichroic polarizer cube to be projected in visible light in the long wavelength band, images recorded in said second medium are reflected by said dichroic polarizer cube to be projected in visible light in the short wavelength band, and light from both long wavelength and short wavelength bands backlighting identical images recorded in both of said first and second mediums will be combined to project images in a color containing both said long wavelength and said short wavelength bands.

2. The recording and projection system claimed in claim 1 further including a colored filter interposed between said dichroic element and one of said recording mediums for altering the color content of the projected images recorded in said medium.

3. The recording and projection system claimed in claim 1 wherein said laser is a pulsed laser.

4. The recording and projection system claimed in claim 3 further including a blanking modulator interposed in the laser beam between said laser and said dichroic polarizer cube.

5. A method for simultaneously displaying, in color, transparent images recorded on first and second recording mediums, said method comprising the steps of:

projecting white light from a lamp source into a first dichroic element that divides said white light into a first beam of long wavelength visible light that is transmitted through said element and a second beam of short wavelength visible light that is reflected by said element;

directing said first beam through the first recording medium and into a second dichroic element substantially identical with said first dichroic element whereby the images recorded in said first medium will be transmitted through said second dichroic element;

directing said second beam through the second recording medium to said second dichroic element whereby the images recorded in said second medium will be reflected by said second dichroic element, and whereby the images identically recorded on both said first and said second mediums will be combined by said second dichroic element to produce images in a color containing both said long wavelength visible light and said short wavelength visible light; and projecting the light images transmitted and reflected by said second dichroic element.

* * * * *